(12) United States Patent
Rollet

(10) Patent No.: US 8,052,097 B2
(45) Date of Patent: Nov. 8, 2011

(54) FLYING CONTROL DEVICE FOR A ROTORCRAFT

(75) Inventor: Philippe Rollet, Velaux (FR)

(73) Assignee: Eurocopter, Marignane Cedex (FR)

( * ) Notice: Subject to any disclaimer, the term of this patent is extended or adjusted under 35 U.S.C. 154(b) by 417 days.

(21) Appl. No.: 11/730,656

(22) Filed: Apr. 3, 2007

(65) Prior Publication Data

US 2007/0235593 A1    Oct. 11, 2007

(30) Foreign Application Priority Data

Apr. 5, 2006    (FR) ...................................... 06 02980

(51) Int. Cl.
*B64C 13/12* (2006.01)

(52) U.S. Cl. .............................. 244/229; 24/220; 24/221

(58) Field of Classification Search .................. 244/220, 244/221, 229, 230, 237
See application file for complete search history.

(56) References Cited

U.S. PATENT DOCUMENTS

| | | | | |
|---|---|---|---|---|
| 2,514,212 A * | 7/1950 | Jennings | ......................... | 74/488 |
| 3,999,726 A * | 12/1976 | Carlson et al. | ................. | 244/221 |
| 4,168,045 A * | 9/1979 | Wright et al. | .............. | 244/17.13 |
| 4,420,808 A * | 12/1983 | Diamond et al. | ................ | 701/4 |
| 4,477,043 A * | 10/1984 | Repperger | .................... | 244/223 |
| 4,667,909 A * | 5/1987 | Curci | ............................. | 244/234 |
| 4,688,443 A * | 8/1987 | Fabre et al. | ...................... | 74/469 |
| 5,002,241 A * | 3/1991 | Tizac | .............................. | 244/237 |
| 5,125,602 A * | 6/1992 | Vauvelle | ........................ | 244/223 |
| 5,149,023 A * | 9/1992 | Sakurai et al. | ................. | 244/229 |
| 5,156,363 A * | 10/1992 | Cizewski et al. | .............. | 244/223 |
| 5,195,700 A | 3/1993 | Fogler, Jr. et al. | | |
| 5,431,569 A * | 7/1995 | Simpkins et al. | ............... | 434/29 |
| 5,456,428 A * | 10/1995 | Hegg | ............................. | 244/229 |
| 5,522,568 A * | 6/1996 | Kamen et al. | .............. | 244/17.13 |
| 6,382,556 B1 | 5/2002 | Pham | | |
| 2004/0093130 A1 * | 5/2004 | Osder et al. | ........................ | 701/3 |

FOREIGN PATENT DOCUMENTS

| | | |
|---|---|---|
| FR | 2578221 | 9/1986 |
| FR | 2479133 | 11/1998 |
| WO | WO 98/49056 | 11/1998 |

* cited by examiner

*Primary Examiner* — Tien Dinh
*Assistant Examiner* — Philip J Bonzell
(74) *Attorney, Agent, or Firm* — Brooks Kushman P.C.

(57) ABSTRACT

The invention relates to a rotorcraft cockpit having a left seat and a right seat placed side-by-side, a console extending between the seats, two side sticks, one situated to the right of the right seat and the other situated to the left of the left seat, enabling the pilot to control roll and pitch; a flight control system comprising sensors associated with the side sticks and a computer connected to the sensors serves to convert the orders applied by the pilot to the side sticks into signals for controlling actuators in order to vary roll and pitch; a piloting relationship integrated in the computer stabilizes the response of the rotorcraft in roll and in pitch when a side stick is actuated, and maintains the attitudes in roll and pitch at reference values when neither side stick is actuated.

8 Claims, 1 Drawing Sheet

FLYING CONTROL DEVICE FOR A ROTORCRAFT

The present invention relates to a flying control device for a rotorcraft and to rotorcraft including the device.

FIELD OF THE INVENTION

The technical field of the invention is that of helicopter manufacture.

The present invention relates to a flight control system for a rotary wing aircraft, and in particular to the disposition of control members in the cockpit. The configuration proposed serves to improve the man/machine interface when using side sticks controllers for controlling roll and pitch.

BACKGROUND OF THE INVENTION

Helicopters are generally designed so that the pilot controls roll and pitch with the right hand via a cyclic pitch stick, and the vertical axis with the left hand via a collective pitch control lever. Until now, helicopters and tilt-rotor aircraft with a side-by-side cockpit have used this configuration for the control members.

In a side-by-side cockpit with side sticks, this configuration raises a major problem in terms of the ergonomy for the (co)pilot in the left seat. The side stick installed to the right of the left seat prevents the pilot in the left seat from having easy access to the central console in order to act on the controls that are located thereon, such as an autopilot, and navigation and mission systems. In order to act on the central console, the pilot sitting on the left must use the right hand, and must therefore let go the side stick. The pilot thus temporarily looses piloting control in roll and pitch, unlike the (co)pilot on the right-hand side who keeps control with the right hand while using the left hand to act on the central console. In addition, when making this movement that requires passing an arm over the side stick, the pilot sitting in the left seat runs the risk of hitting the handgrip of the side stick and delivering untimely piloting orders that might be dangerous under certain circumstances, particularly when flying close to obstacles.

Proposals are made in French patent FR-2 479 133 for a fly-by-wire (FBW) control system for a helicopter that has four control axes (pitch, roll, yaw, lift); the system has a force control lever that is sensitive relative to three or four control axes; the signals delivered by each force sensor are processed in a manner that includes applying both a "dead band", and proportional and integral (PI) amplification.

French patent FR-2 576 281 describes an aircraft cockpit provided with a side stick, and a seat in which an armrest is hinged.

French patent FR-2 578 221 describes a mechanical system for coupling together two side sticks for piloting an aircraft.

U.S. Pat. No. 5,137,234 describes another device for mechanically coupling side sticks together.

French patent FR-2 754 515 describes a tactile warning system in the event of multiple/simultaneous piloting by two pilots using two mechanically independent control sticks.

In spite of the theoretical advantages of those devices, there remains a major need for rotorcraft flying controls that are more ergonomic.

OBJECTS AND SUMMARY OF THE INVENTION

The main object of the present invention is to improve the ergonomics of the pilot controls of a rotary wing aircraft fitted with a side-by-side cockpit and having side sticks.

Another object is to simplify the installation and reduce the weight of control members, in particular of the two collective pitch (or power) control levers which are generally coupled together mechanically.

Another object is to propose a rotorcraft flight control system that is improved and/or that remedies, at least in part, the shortcomings and drawbacks of known flight control systems.

In one aspect, the invention consists in inverting the disposition of the controls for the left seat, thus enabling the copilot (sitting on the left) to keep control over roll and pitch even when acting on the central console; any awkwardness that might result from the copilot being constrained to control roll and pitch with the left hand is compensated by an appropriate stabilization relationship (piloting relationship) that is integrated in the flight control computer that receives the signals from the control sticks.

According to another aspect of the invention, there is provided a rotorcraft including at least one main lift and propulsion rotor and a cockpit comprising:
- a left seat and a right seat placed side-by-side and having respective axes for their installation in the cockpit that are spaced apart by a spacing;
- a central console extending at least in part in the space between the seats or in line with said space; and
- two side sticks enabling the pilot and the copilot to control roll and pitch;
- the rotorcraft including a flight control system having sensors associated with the side sticks and at least one computer connected to the sensors and converting the orders applied by the pilot to the side sticks into electrical or optical signals for controlling actuators associated with the rotor in order to vary roll and pitch;
- one of the side sticks being situated to the right of the right seat and the other side stick to the left of the left seat, and a piloting relationship is integrated in the computer(s) for stabilizing the response of the rotorcraft in roll and in pitch when at least one of the pilots acts on one of the side sticks, and for maintaining the attitudes in roll and in pitch at reference values when both side sticks are released, i.e. when no side stick is actuated.

In an embodiment of the invention, the cockpit includes two levers or members enabling the pilot and the copilot to control the collective pitch and engine power, the levers/members being coupled together mechanically or electrically, one of them being situated to the left of the right seat and the other to the right of the left seat.

In particular the control levers/members for varying the collective pitch of the main rotor of the rotorcraft may be coupled together by a mechanical coupling system of length that is shorter than the spacing of the seats.

Thus, in the invention, the controls are disposed symmetrically about the right seat and the left seat.

In this configuration for a rotary wing aircraft, the controls are disposed as follows in the cockpit:
- for the (co)pilot seat on the right of the cockpit, a side stick controlling at least roll and pitch is placed to the right of the seat, and a collective pitch (power) control lever is situated to the left of the seat;
- for the (co)pilot seat on the left of the cockpit, a side stick controlling at least roll and pitch is placed to the left of the seat, and a collective pitch (power) control lever is situated to the right of the seat.

With this configuration, the pilot on the left can easily access the console with the right hand while keeping the left hand in control of the side stick. This ease of access is also identical to that available to the pilot installed on the right seat.

The lateral spacing between the two collective pitch control levers is also reduced to a minimum, thereby making them easier to couple together mechanically, where necessary. In particular, the length of the shaft interconnecting the levers, usually not less than the seat spacing, becomes close to the width of the console, thereby achieving a significant saving in weight.

BRIEF DESCRIPTION OF THE DRAWING

Other aspects, characteristics, and advantages of the invention appear from the following description which refers to the accompanying drawing, which shows, without any limiting character, preferred embodiments of the invention.

MORE DETAILED DESCRIPTION

Figure 1:
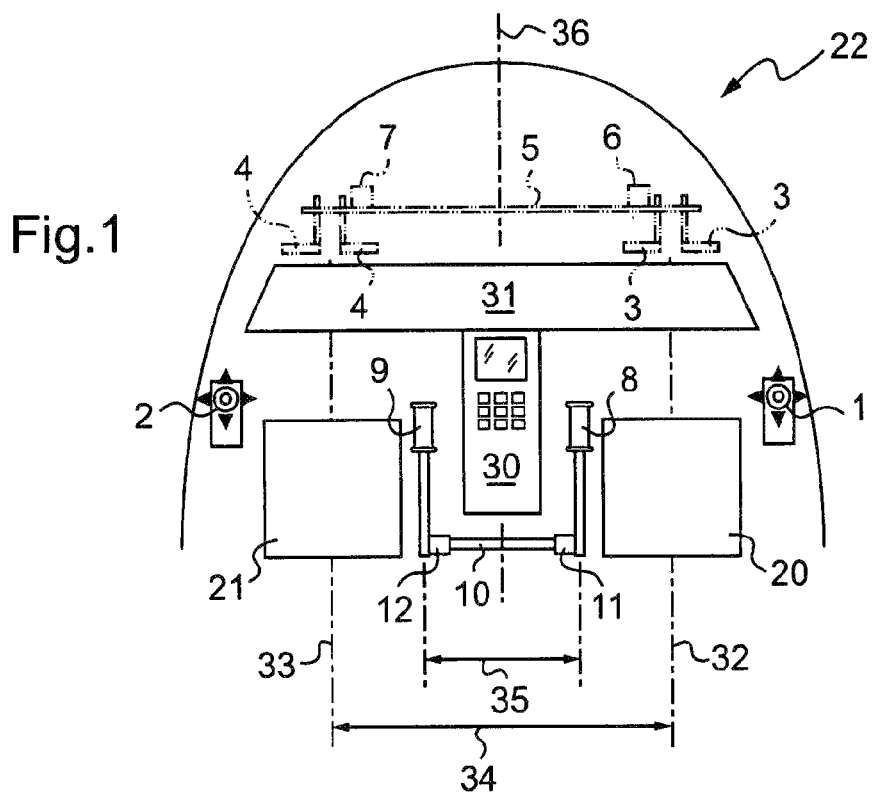
FIG. 1 is a diagrammatic plan view showing the configuration of a helicopter of the invention having a side-by-side cockpit and provided with a fly-by-wire (FBW) control system having side sticks for controlling roll and pitch.
Figure 2:
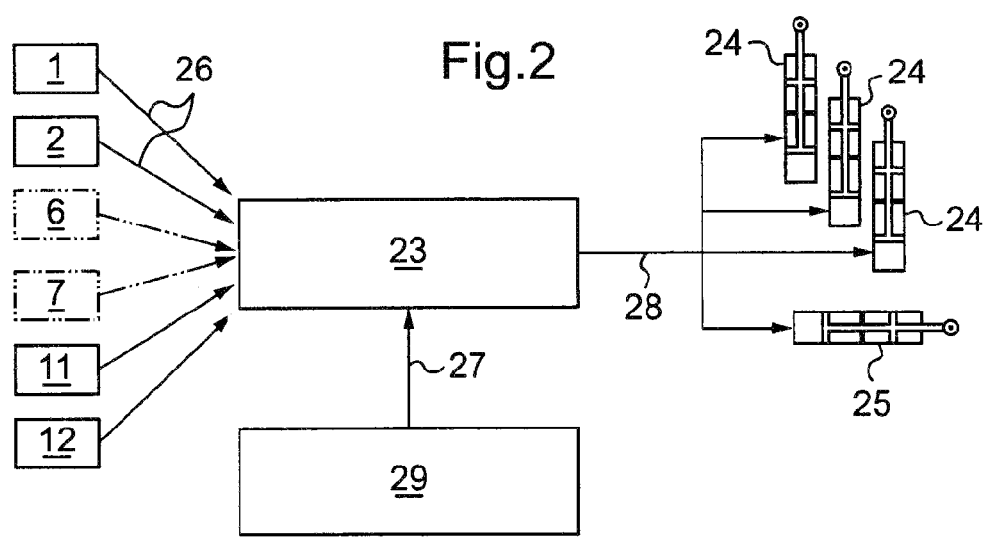
FIG. 2 is a simplified diagram of the optical or electric fly-by-wire control system adapted to the configuration of FIG. 1.

In an embodiment, the invention applies to a helicopter having a cockpit 22 of the side-by-side type, and provided with an electric fly-by-wire (FBW) control system with side sticks 1 and 2 for controlling roll and pitch, as shown in FIG. 1. The connections between the computers, the state sensors, and the servo-controls of the FBW control system are shown in FIG. 2.

With reference to FIG. 1 in particular, the cockpit 22 of the rotorcraft presents general symmetry about a fore-and-aft vertical plane whose trace in the plane of FIG. 1 is referenced 36.

The cockpit 22 has two seats 20, 21 facing an instrument panel 31 disposed transversely across the longitudinal axis 36 of the rotorcraft; the instrument panel carries the usual instruments and is associated with a console 30 that extends in part between the seats 20 and 21, and in part in front of the seats.

The distance 34 between the respective fore-and-aft axes 32 and 33 of the seats 20 and 21 (referred to as the seat spacing) is greater than the distance 35 between the collective pitch control levers 8 and 9.

To simplify the description, the right and left seats 20 and 21 are referred to respectively as the "pilot seat" and as the "copilot seat". The crew members occupying the "pilot seat" and the "copilot seat" are respectively referred to as the "pilot" and the "copilot".

A side stick 1 (mini stick) installed to the right to the pilot seat 20 converts into electrical signals the roll and pitch orders applied by the pilot using the right hand on the handgrip of the side stick. These electrical signals are delivered to the FBW control computers 23 (FIG. 2) which, by applying piloting relationships, generate orders for controlling actuators 24, 25 associated respectively with the main rotor and with the tail rotor in order to vary the attitude and the speed of the rotorcraft.

A side stick 2 (mini stick) installed to the left of the copilot seat 21 converts into electrical signals the roll and pitch orders applied thereto by the copilot using the left hand on the handgrip of the side stick. These electrical signals are likewise delivered to the FBW control computers, using the same logic as is applied to the signals from the other side stick 1.

Two pedal units 3 and 4 are situated in front of the pilot and copilot seats respectively and they are interconnected, e.g. by a mechanical coupling system 5.

Two yaw sensor blocks 6 and 7 convert into electrical signals the yaw orders applied by the pilot and/or the copilot to the pedal units 3 and 4. These electrical signals are delivered to the FBW control computers which, by applying piloting relationships, deliver control orders to the rotors.

A collective pitch lever 8 installed to the left of the pilot seat 20 to be controlled by the pilot's left hand, and a collective pitch lever 9 installed to the right of the copilot seat 21 to be controlled by the copilot's right hand are interconnected by a mechanical system 10 that is constituted by a torsion tube installed between the two collective pitch levers, and that serves to ensure mechanical coupling of their respective movements.

Two collective sensor blocks 11 and 12 convert into electrical signals the control orders applied by the pilot and/or the copilot to the collective pitch levers 8 and 9.

With reference to FIG. 2 in particular, the control members 1, 2, 6, 7, 11, and 12, and/or the sensors and actuators fitted to said members, are all connected to the computer 23 by connections 26; in particular when the control member is a side stick that is active, the corresponding connection is a both-way connection.

The computer 23 receives signals or data delivered by sensors 29 concerning the state of the helicopter, via a connection 27. A connection 28 connects the computer 23 to the servo-controls 24, 25 for varying the pitch of the rotor blades, and serves to transmit the orders generated by the computer 23 as a function of the signals it receives.

The FBW control computer includes piloting relationships for generating axis controls (pitch, roll, collective pitch, yaw) which, after being processed by a mixer module, are subsequently sent to the servo-controls of the rotors and to the engines.

The piloting relationships are designed both to stabilize the helicopter when the pilot (or copilot) does not exert any action on the controls (a so-called "hands-off" mode), and to facilitate piloting when the pilot (or the copilot) acts on the controls (a so-called "hands-on" mode).

A piloting relationship comprises in particular at least the following characteristics:
  an attitude-maintaining mode which maintains the roll and pitch attitudes at reference values in hands-off mode; and
  a mode that stabilizes the roll and pitch responses when the pilot (or copilot) acts on the side sticks 1, 2.

The characteristics of the above-specified piloting relationship, by the assistance they provide to piloting, enable the copilot to control roll and pitch accurately and without excessive workload by using the left hand to act on the left side stick, even if the copilot is "right-handed" and/or is in the habit of controlling roll and pitch with the right hand.

In a first variant, the piloting relationship is arranged so that the longitudinal and lateral actions on the side sticks 1 and 2 at slow speeds serve respectively to control directly the longitudinal and lateral speeds of the rotorcraft relative to the ground.

In general, the piloting relationships enable the helicopter to offer its pilot ease of piloting that is close to that of piloting an airplane, and thus compatible with piloting roll or pitch equally well with the left hand or the right hand.

In a second variant, the two collective pitch levers 8, 9 are replaced by two side sticks situated respectively to the left of the right seat (pilot seat) and to the right of the left seat (copilot seat). They may be coupled together either mechanically by a device similar to the pitch levers in the basic version, or else electrically. If they are coupled together electrically, then the "collective pitch" side sticks must be of the "active" type, i.e. movement thereof is associated with an electric motor that has its position servo-controlled.

This variant thus has four side sticks (two for the pilot seat and two for the copilot seat).

In a third variant, the cockpit does not have any pedal units and is fitted with two "three-axis" side sticks in the same disposition (on either side of the seats). The "three-axis" side sticks enable the pilot to control roll, pitch, and yaw simultaneously. More precisely, the pilot (or copilot) controls yaw by applying a twisting movement or force to the handgrip of the side stick.

In this variant, a stabilizing piloting relationship is introduced on the yaw axis. This relationship possesses the following characteristics:

in stationary flight and at low speeds, the angular speed in yaw is proportional to the twisting action on the handgrip of the side stick; in the absence of any twisting action on the handgrip of the side stick, the rotorcraft maintains an angular speed in yaw that is zero;

in forward flight, the lateral g-force is proportional to the twisting action exerted on the handgrip of the side stick; in the absence of any twisting action on the handgrip of the side stick, the rotorcraft maintains a lateral g-force of zero.

In a fourth variant, the cockpit has no pedal units and no collective pitch levers, and it is fitted with two "four-axis" side sticks. The "four-axis" side sticks enable each pilot to control simultaneously roll, pitch, yaw, and collective pitch. More precisely, the pilot (or copilot) controls collective pitch by applying a vertical movement or force on the handgrip of the side stick.

In this variant, stabilizing piloting relationships are provided both on the yaw axis and on the collective pitch axis.

On the yaw axis, the relationship possesses at least the characteristics needed for the third variant.

On the collective pitch axis, the relationship possesses the following characteristics: the vertical speed (rate of climb/descent) is proportional to the vertical action exerted on the handgrip of the side stick; in the absence of any vertical action on the handgrip of the side stick, the rotorcraft maintains its altitude.

The invention presents the following advantages in particular:

a more ergonomic left pilot seat, in particular for the copilot (installed on the left):
  easier access to the central console (the obstacle constituted by the side stick traditionally installed on the right disappears);
  the possibility of continuing to perform roll/pitch piloting while also acting on the central console (left-hand piloting);
  emergency evacuation rearwards made easier without any special device (the collective pitch lever in the low position is not an impediment, whereas a side stick in the same position constitutes a major obstacle and requires a retraction device for emergency evacuation);
simplification in installing the piloting members, in particular because it is possible to install the copilot side stick on the left partition of the cockpit, thus avoiding mounting it on a pedestal (a saving in space and in weight); and a significant reduction in the distance between the two collective pitch levers, thus making mechanical coupling both simpler and lighter in weight.

Naturally, in the present application, the terms "left" and "right" are used relative to an observer situated in the rotorcraft and looking to the front of the rotorcraft.

What is claimed is:

1. A rotorcraft including at least a main lift and propulsion rotor and a cockpit comprising:
  a left seat and a right seat placed side-by-side and having respective axes for their installation in the cockpit that are spaced apart by a spacing;
  a central console extending at least in part in the spacing between the seats; and
  two side sticks enabling the pilot and the copilot to control roll and cyclic pitch;
  the rotorcraft including a flight control system having sensors associated with the side sticks and at least one computer connected to the sensors and converting the orders applied by the pilot to the side sticks into electrical or optical signals for controlling actuators associated with the rotor in order to vary roll and cyclic pitch;
  wherein:
  one of the side sticks is situated to the right of the right seat and the other side stick is situated to the left of the left seat; at least one piloting relationship integrated in the computer stabilizes the response of the rotorcraft in roll and in cyclic pitch when a side stick is actuated and maintains the roll and cyclic pitch attitudes at reference values when neither side stick is actuated; and
  the cockpit includes two members for controlling collective pitch and engine power, the members being coupled together mechanically or electrically, one of the members being situated to the left of the right seat and the other being situated to the right of the left seat, the two members for controlling collective pitch being located between the central console and, respectively, the left seat and the right seat; while said central console, left and right seat, the two side sticks and the two members for controlling collective pitch being disposed symmetrically in the cockpit.

2. The rotorcraft according to claim 1, in which a piloting relationship is arranged so that at low speeds the longitudinal and lateral actions on the side sticks control directly respectively the longitudinal and lateral speeds of the rotorcraft relative to the ground.

3. The rotorcraft according to claim 1, in which the members are two levers coupled together by a mechanical coupling structure of length that is less than the spacing.

4. The rotorcraft according to claim 1, in which the members are two active side sticks that are coupled together electrically.

5. The rotorcraft according to claim 1, in which the cockpit does not have a pedal unit and in which the two side sticks control roll, cyclic pitch, and yaw of the rotorcraft.

6. The rotorcraft according to claim 5, in which a piloting relationship on the yaw axis, and integrated in the computer, performs the following actions:
  in stationary flight and at low speeds, the angular speed in yaw is proportional to the twisting action on the handgrip of the side stick, and in the absence of twisting action on the handgrip of the side stick, a speed in yaw of zero is maintained; and
  in forward flight, the lateral g-force is proportional to the twisting action exerted on the handgrip of the side stick, and in the absence of twisting action on the handgrip of the side stick, a lateral g-force of zero is maintained.

7. The rotorcraft according to claim 1, wherein the cockpit has a pedal unit that controls yaw of the rotorcraft.

8. The rotorcraft according to claim 7, wherein a piloting relationship on the yaw axis, and integrated in the computer, performs the following actions:

in stationary flight and at low speeds, the angular speed in yaw is proportional to the twisting action on the handgrip of the side stick, and in the absence of twisting action on the handgrip of the side stick, a speed in yaw of zero is maintained; and in forward flight, the lateral g-force is proportional to the twisting action exerted on the handgrip of the side stick, and in the absence of twisting action on the handgrip of the side stick, a lateral g-force of zero is maintained.

* * * * *